(12) United States Patent
Usher et al.

(10) Patent No.: US 7,120,435 B2
(45) Date of Patent: Oct. 10, 2006

(54) MOBILE CELLULAR RADIO

(75) Inventors: Martin Philip Usher, Ruislip (GB); Andrew Wayne Allaway, Uxbridge (GB)

(73) Assignee: Stratos Global Ltd., London (GB)

( * ) Notice: Subject to any disclaimer, the term of this patent is extended or adjusted under 35 U.S.C. 154(b) by 720 days.

(21) Appl. No.: 09/833,594

(22) Filed: Apr. 13, 2001

(65) Prior Publication Data

US 2002/0006792 A1  Jan. 17, 2002

(51) Int. Cl.
*H04Q 7/20* (2006.01)
(52) U.S. Cl. .................... 455/431; 455/426.1; 455/427
(58) Field of Classification Search ........ 455/427–428, 455/431, 566–567, 432.2, 412.2, 556.1, 466, 455/414.4, 417, 414.1
See application file for complete search history.

(56) References Cited

U.S. PATENT DOCUMENTS

| | | | |
|---|---|---|---|
| 4,774,514 A | 9/1988 | Hildebrandt et al. | |
| 5,438,610 A | 8/1995 | Bhagat et al. | |
| 5,490,284 A | 2/1996 | Itoh et al. | |
| 5,519,761 A | 5/1996 | Gilhousen | |
| 5,577,264 A | 11/1996 | Tuohino | |
| 5,809,428 A * | 9/1998 | Garahi et al. | 455/517 |
| 5,842,132 A | 11/1998 | Fukutomi | |
| 5,887,258 A | 3/1999 | Lemozit et al. | |
| 5,950,129 A * | 9/1999 | Schmid et al. | 455/431 |
| 5,963,877 A | 10/1999 | Kobayashi | |
| 6,002,944 A | 12/1999 | Beyda | |
| 6,173,159 B1 * | 1/2001 | Wright et al. | 455/66.1 |
| 6,181,990 B1 * | 1/2001 | Grabowsky et al. | 701/14 |
| 6,188,887 B1 * | 2/2001 | Joong et al. | 455/417 |
| 6,269,243 B1 | 7/2001 | Corbefin et al. | |
| 6,321,084 B1 * | 11/2001 | Horrer | 455/431 |
| 6,363,248 B1 * | 3/2002 | Silverman | 455/417 |
| 6,408,180 B1 * | 6/2002 | McKenna et al. | 455/431 |
| 6,430,412 B1 * | 8/2002 | Hogg et al. | 455/436 |
| 6,509,827 B1 * | 1/2003 | Berstis et al. | 340/7.52 |
| 6,529,706 B1 * | 3/2003 | Mitchell | 455/12.1 |
| 6,603,967 B1 * | 8/2003 | Sinivaara et al. | 455/431 |
| 6,643,510 B1 * | 11/2003 | Taylor | 455/431 |
| 6,757,712 B1 * | 6/2004 | Bastian et al. | 709/206 |
| 6,889,042 B1 * | 5/2005 | Rousseau et al. | 455/431 |

FOREIGN PATENT DOCUMENTS

| | | |
|---|---|---|
| EP | 0 838 909 | 4/1998 |
| EP | 0 862 283 | 9/1998 |
| EP | 0 915 577 | 5/1999 |
| EP | 0 920 147 | 6/1999 |
| EP | 0 923 257 | 6/1999 |
| EP | 0 932 266 | 7/1999 |

(Continued)

OTHER PUBLICATIONS

International Search Report for PCT/IB01/00830.

(Continued)

*Primary Examiner*—George Eng
*Assistant Examiner*—Brandon J. Miller
(74) *Attorney, Agent, or Firm*—Steptoe & Johnson LLP

(57) ABSTRACT

A method of forwarding a data message to a vehicle is provided. The method includes registering a user's cellular identity as present aboard a vehicle; receiving a data message intended for the cellular telephone associated with the user's cellular identity, the data message including at including at least a first address and a data packet, the first address being associated with the user's cellular identity; associating the data packet with a destination address, the destination address representing a wireless node aboard the vehicle; and forwarding the data packet to the vehicle consistent with the destination address.

6 Claims, 11 Drawing Sheets

FOREIGN PATENT DOCUMENTS

| | | |
|---|---|---|
| EP | 0 936 829 | 8/1999 |
| FR | 2773931 | 7/1999 |
| GB | 2169175 | 7/1986 |
| GB | 2 282 299 | 3/1995 |
| GB | 2310973 | 9/1997 |
| GB | 2320992 | 7/1998 |
| GB | 2324395 A * | 10/1998 |
| WO | WO 94/28684 | 12/1994 |
| WO | WO 97/36442 | 10/1997 |
| WO | WO 97/37500 | 10/1997 |
| WO | WO 98/21838 | 5/1998 |
| WO | WO 98/26521 | 6/1998 |
| WO | WO 99/12227 | 3/1999 |
| WO | WO 99/62274 | 12/1999 |
| WO | WO 01/15337 | 3/2001 |

OTHER PUBLICATIONS

International Search Report for PCT/GB00/03074.
International Search Report for PCT/GB00/03087.
International Search Report for PCT/IB01/00811.
International Search Report for PCT/GB00/03088.
International Search Report for PCT/IB01/00802.

Suzuki et al., "Call Routing and Data Model for Inter-Network Roaming in PCS", IEICE Trans. Commun., vol. E79 B. No. 9, Sep. 1996, pp. 1371-1379.

Uchiyama et al., "Network Functions and Signaling for Personal Roaming between Digital Cellular Standards", IEEE International Conference on Universal Personal Communications, New York, IEEE, vol. CONF. 4, Nov. 1995, pp. 447-451.

Nodera et al., "Interworking between GSM and PDC through IC Cards", Proceedings of the Conference on Communications (ICC), New York, IEEE, Jun. 1995, pp. 761-765.

GSM World Press Release, "GSM Association Agreement with SkyPhone to use *TAP* for Billing makes Calling from Aircraft Simple", http://www.gsm.org/news/press_releases_04.html, Aug. 1999.

Fernandez et al., "Le TFTS Alcatel 9810: un systemme europeen de communications air-sol", Commutation et Transmission, vol. 13, No. 4, Sotelec, Paris, France, 1991, pp. 5-16.

BTtoday NEWSDESK website, "Lift off for BT in-flight GSM service", http://today.intra.bt.com/art6594.html, Jul. 2000.

Beresford, "Office in the sky is now ready for take off", BT today, Jan. 2000, p. 4.

* cited by examiner

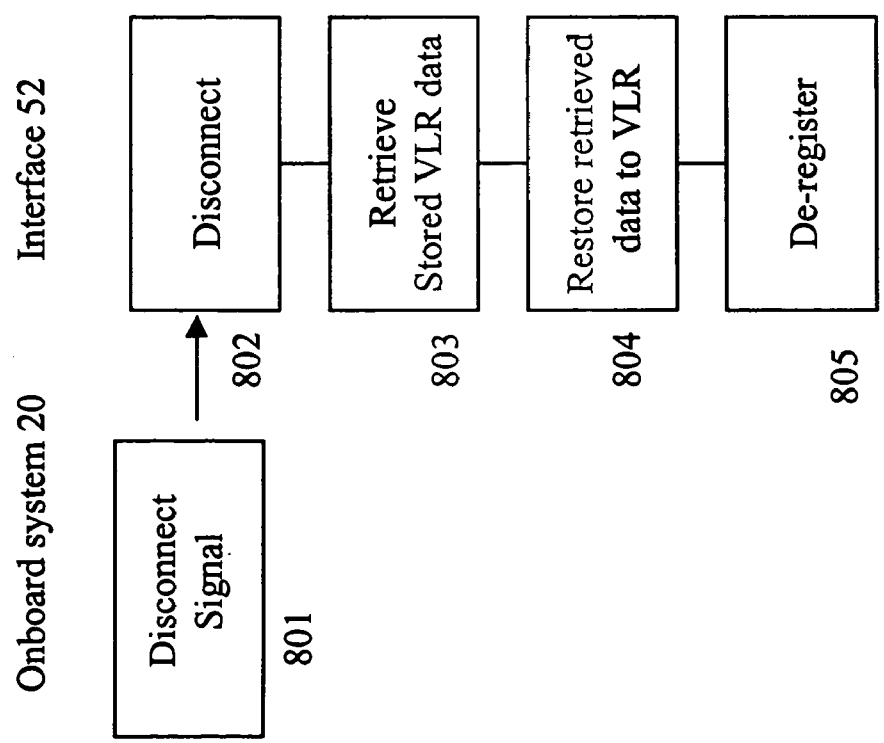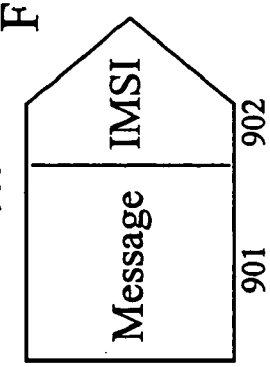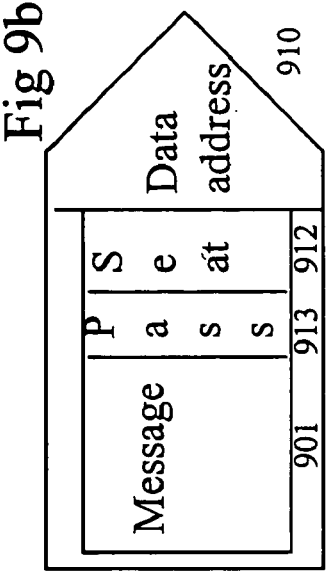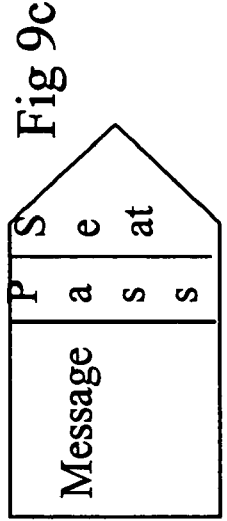

MOBILE CELLULAR RADIO

This invention relates to cellular radio systems, and in particular to a system for allowing the use of a mobile cellular telephone on board an aircraft or other vehicle when the use of the fixed base stations of a cellular telephone system is impractical or not permitted.

In a cellular radio system one or more mobile radio telephones may each establish a radio connection with one of a number of fixed radio transceivers, connected to a telephone switching system, and they are thus able to set up and make telephone calls. Arrangements are made such that if the mobile telephone moves out of range of the fixed radio transceiver, connection with the switching system can be maintained or resumed by a "handover" process, by which the mobile telephone establishes radio contact with another fixed radio transceiver.

It is known to provide cellular radio coverage on board a vehicle such as a railway train using a passive fibre optic network or similar. Connections from several mobile telephones on board the vehicle are fed to a single repeater antenna on the vehicle, which communicates with the cellular radio fixed base station nearest to the vehicle. Handover from one fixed base station to another is controlled for all mobile units together by a vehicle-borne repeater unit. This system reduces signalling overload when several mobile units on the vehicle enter a new cell at the same time, possibly at high speed. However, as the repeater co-operates with the fixed base transceivers of the cellular system, it cannot be used outside the range of such transceivers.

There would be a number of practical difficulties in using a standard cellular telephone in the air. Firstly, although reliable handover of a mobile unit can be achieved from moving vehicles travelling at speeds of up to 200 km/h, a typical passenger aircraft travels at speeds approaching 1000 km/h. Moreover, frequency re-use patterns, which allow several base stations to use the same radio frequencies without interference, are designed on the assumption that a mobile unit served by one base station is not able to exchange radio signals with other base stations using the same frequency. This assumption ceases to be valid if the mobile unit is several thousand meters above the ground, as it will be in line-of-sight of a large number of base stations simultaneously. In fact, many cellular base stations have antennas arranged for maximum gain in the horizontal plane, so an airborne cellular telephone may in fact be unable to obtain a signal from any base station, even though a large number of them are in line-of-sight.

For truly global coverage, satellite telephones are available. However, these are expensive, and much heavier than a cellular telephone. They are therefore only preferred by users who frequently need to make or receive calls when out of range of the cellular network.

The use of portable radio telephones on board aircraft is discouraged, and in many cases forbidden, because of the perceived potential for interference with the aircraft's own electronic systems. Some airline operators provide special telephone facilities on board their aircraft, such as the service provided to several airlines by the applicant company under the Registered Trade Mark "Skyphone". This service uses onboard terminals connected, through a satellite link between the aircraft and a ground station, to the telephone network. Another system, TFTS (terrestrial flight telephony system, marketed as "Jetphone"), operates in a similar manner, but uses a direct link between the aircraft and a ground station, without a satellite link. However payment for these services is generally at the point of use (or prepaid), and may be in a foreign currency. Calls made to the user's cellular telephone will not be successful unless the calls can be diverted to the telephone number of the onboard user terminal (which will generally not be known to the caller), and any special facilities offered by the user's cellular network will in general be unavailable.

Through "roaming" agreements between network operators, a user can use his cellular telephone to make and receive calls in many different countries. If it were possible, a user with his own cellular telephone account would therefore prefer to continue to use his cellular telephone subscription when travelling within or between these countries on board an aircraft or other vehicle.

This is made possible by an invention disclosed in European Patent Application 99307279.2, filed by the applicant company on Sep. 14, 1999, which provides apparatus for enabling a termination point of a first telecommunications system to initiate call diversion instructions in the switching system of a second telecommunications system such that calls initially directed to a telephone apparatus usable with the second telecommunications system are diverted to the said termination point in the first telecommunications system, the apparatus comprising means in the first telecommunications system for identifying the telephone apparatus from which calls are to be diverted and the termination point to which calls are to be diverted, and an interface means between the first telecommunications system and the switching system of the second telecommunications system, the interface means comprising:

means to indicate to the switching system that the telephone apparatus is in a specified operating condition, irrespective of the true operating condition of the telephone apparatus, and means to generate an instruction to the switching system to divert calls, intended for the telephone apparatus, to the said termination point of the first telecommunications system when the telephone apparatus is indicated as being in the said predetermined operating condition.

In the preferred arrangement the first and second telecommunications systems are a satellite telephone system and a cellular telephone system respectively, the identification information being a user identity associated with the telephone apparatus, and the network address of the termination point.

Other aspects of the invention disclosed in the aforementioned European patent application provide the novel features of each of the individual telecommunications systems which co-operate to form the complete system, and methods of operation of these individual co-operating systems and of the complete process.

A second arrangement, disclosed in the applicant's European Patent Application having the same filing date as the present application and the applicant's case reference A25941, has apparatus for providing telephone connection between one or more cellular radio telephones and a fixed cellular radio switching system, comprising a moveable cellular system on board a vehicle, a fixed cellular radio switching system, and a tracking radio link providing radio connection between the moveable cellular switching system and the fixed cellular switching system, the moveable cellular system comprising a moveable telephone switching system connected to one or more base transceiver stations for providing radio connection with the cellular radio telephones, and having means for initiating a control call over the tracking radio link to the fixed cellular radio switching system in response to the detection of the presence of a cellular radio telephone in the area of coverage of base transceiver stations, and the fixed cellular radio switching system having registration means responsive to such control calls to indicate to other switching systems that calls to a cellular radio telephone currently served by the moveable switching system should be initially directed to the fixed cellular radio switching system, the fixed cellular radio switching system also having call diversion means responsive to such control calls to allow incoming calls directed to the cellular radio telephone to be diverted to the moveable cellular switching system by way of the tracking radio link. In the embodiment described in that application, the movable system has means for generating an association between a destination node of the tracking radio link and an identity code of a cellular radio telephone, and means for storing the said associated identities in stores associated with the fixed and moveable cellular switching systems, thereby allowing both cellular radio switching systems to translate between the cellular radio identity and the node identity. The apparatus is arranged such that calls directed to a cellular telephone currently co-operating with the moveable switching cellular system are diverted by the fixed cellular switching system to a node of the tracking radio system having the identity associated with the cellular radio identity, the node having means for connecting the call to the moveable cellular switching system and the moveable switching system having means for retrieving the cellular network identity associated with the node and routing the call to the cellular telephone having that identity.

In the cellular telephone systems described in the aforementioned European Patent applications the interface units are arranged to appear to the switching system as a typical radio base station control system, to which the mobile handset is currently working, although in fact no radio base stations are actually controlled by it. This interface unit may therefore be considered to be a "Virtual" Base Site Controller. The switching system itself requires no modification: it merely registers that the user is working to the "Virtual" Base Site Controller and stores the user details in its "Visitor Location Register" (VLR), in the same way as it would for a mobile unit working to any real base site controller to which it is connected. The interface unit also generates a call diversion instruction, which will appear to the switching system to have come from the mobile handset, by way of the "Virtual" Base Site Controller. This call diversion instruction is set up in the switching system such that if the "Virtual" Base Site Controller responds to a call request directed to the mobile unit with a "busy line" response (or some other specified condition), calls are to be diverted, through normal network interconnects, to a specified directory number, namely that of the satellite termination point to which the user is connected. The interface unit does not in fact monitor the real condition of the user terminal, (which is not operatively connected to the interface unit), but instead always returns the "line busy" signal to the switching system.

The interface unit includes a store to record any diversion settings existing for the telephone apparatus prior to the diversion to the second network being set up. This allows these settings to be retrieved when the user disconnects from the first telecommunications system, so that they can be reinstated in the switching system of the second telecommunications system, or transferred to another telecommunications system, when the telephone apparatus makes contact with a real radio base station, thereby initiating a handover procedure from the "Virtual" Base Site Controller to the real one.

Should a second call attempt to the user's cellular telephone be made whilst a call is in progress to the onboard system, the switching system may be arranged to divert it to another predetermined number, such as the user's "voicemail", or automatic answering service, address.

If the user termination is in an aircraft or other vehicle connected to a ground station (by satellite or otherwise), it may move from the area covered by one satellite (or ground station) to that of another. In that case, the network address of the termination changes. To accommodate this, the interface may be provided with means to store the address of termination points in the first system, means to record changes to the said addresses transmitted to it from the first system, and means to modify the diversion instruction in the switching system when such a change takes place. Alternatively, the termination point may be arranged simply to repeat the set-up process, causing the mobile unit to be re-registered with the interface unit, (which will not be apparent to the switching system, as it will perceive the same "virtual" base site controller), and to transmit a new call divert instruction to the revised address of the termination point.

The inventions disclosed in the aforementioned European patent applications allow the diversion of PSTN-compatible speech calls to the user's current location in the first telecommunications network. However, modern cellular telephone systems have other capabilities, in particular the data system known in the GSM standard as "Short Message Service" (SMS). In the cellular network data messages are carried over a separate data network and cannot be diverted to a different directory number, such as that of the user's current satellite terminal, or the satellite address currently associated with the user's terminal, in the same way as voice calls because the PSTN cannot handle them. Moreover, with regard to arrangements in which the call is routed to a standard satellite telephone terminal as provided in aircraft, such terminals are not equipped to receive such messages.

A first aspect of the present invention provides a method of converting data messages originally formatted for transmission over a first telecommunications network for generation of a display on a display unit of a first type, such that messages can be transmitted over another telecommunications network for display by a selected display unit of a second type forming part of a server-based information display system, wherein the address information in the original data message is replaced by address information appropriate to the selected display unit to generate an amended data message, and a new data message is created, addressed to the server of the information display system and having the amended data message as payload, and wherein the server converts the amended data message into control instructions suitable to display the information content of the data message on the information display unit identified in the amended data message.

A second aspect provides apparatus for converting data messages originally formatted for transmission over a first telecommunications network for generation of a display on a display unit of a first type, such that messages can be transmitted over another telecommunications network for display by a selected display unit of a second type forming part of a server-based information display system, comprising means for replacing the address information in the original data message by address information appropriate to the selected display unit to generate an amended data message, means for creating a new data message addressed to the server of the information display system and having the amended data message as payload.

A third aspect provides server apparatus forming part of a server-based information display system for receiving messages generated by the apparatus defined above, for display by a selected display unit, the server comprising means for converting a data message formatted for display on a display unit of a first type into control instructions suitable to display the information content of the data message on an information display unit of a second type controlled by the server, the information display unit being identified in the data message.

In the described embodiment the data message is originally formatted for transmission over a cellular telephone network for display by a cellular telephone handset. The data message may be generated by the cellular switching system in response to a message being deposited in a call answering system.

In one arrangement, prior to transmission of the amended original data message to the server an alerting data message is created, indicative of the presence of the original data message, addressed to the server of the information display system, and carrying address information appropriate to the selected display unit, thereby causing the server to generate control instructions suitable to display an alerting message on the information display unit so identified, and wherein the amended original data message is forwarded to the server in response to an instruction from a termination point associated with the destination display unit. This ensures that data messages are only transmitted when the user has accepted them, thus allowing the network operator to charge the user for the service.

The amended data message may also include password data, the server being arranged such that when it receives a data message it causes the display means to indicate the presence of a data message, and displays the data message only if it receives a predetermined input from a user terminal associated with the display means.

The telecommunications termination point may be provided with reading apparatus for reading an information carrier encoded with the user's identity. Such apparatus is commonly used for telephone terminals to which the public has access to allow calls to be charged to a user's credit card account, or an account with the service provider, or to deduct value from a stored value on the card.

In those cellular systems where the user identity is carried on a data carrier card transferable between telephone handsets, the reading apparatus may be arranged to read this carrier. In the "GSM" standard these cards are known as "Subscriber Identity Modules" or SIMs, and are either of standard credit card size (86 mm×54 mm) or rather smaller (14 mm×25 mm), and may be transferred from one cellular telephone handset to another to allow the same telephone user account and directory number to be used with different handsets.

The onboard user terminal may be arranged to co-operate with the complete cellular telephone. Although this requires a more complex interface between the cellular telephone and the user terminal, it allows the user to use the functionality of his own telephone, rather than having to familiarise himself with that of an unfamiliar satellite user terminal.

However, standard on-board satellite telephone card readers may not be compatible with GSM "SIMs", or complete telephones. To avoid the need to modify the user terminals, a user identity may be carried on a special carrier compatible with the existing card readers. This user identity may be the user's cellular radio network identity (IMSI), or some other identity from which it can be derived.

Embodiments of the invention will now be described, by way of example with reference to the drawings, in which FIG. 1 is a schematic diagram showing the functional relationships between the systems which co-operate to form the complete system of the applicant's invention disclosed in European Patent Application 99307279.2;

FIG. 8 is a flow chart showing the process by which the second network restores the original settings for a telephone when it disconnects from the first network.

FIG. 9 illustrates the forwarding process implemented to a data message.

Figure 1:
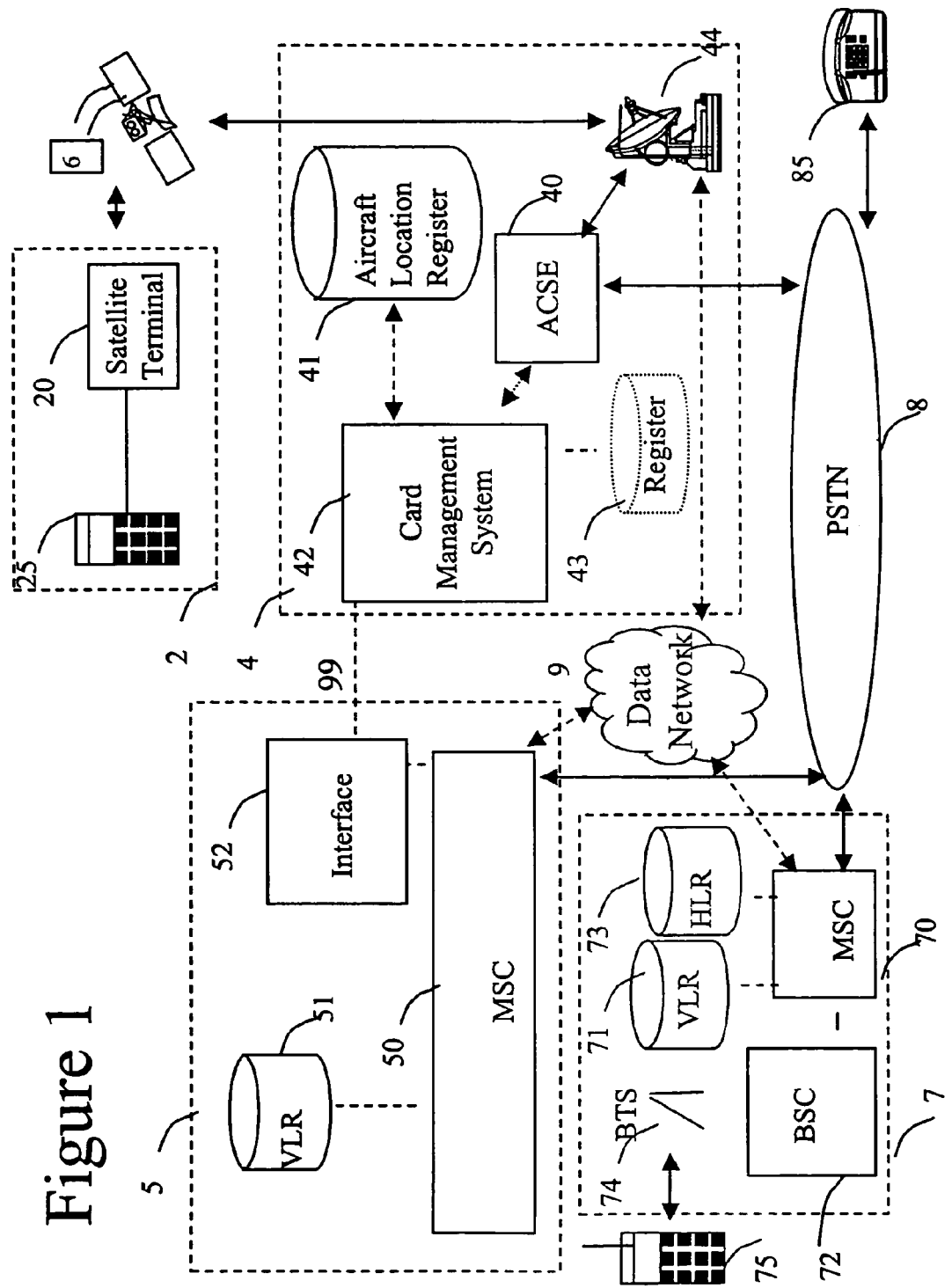
FIG. 1 shows the general arrangement of the various components that co-operate in the first embodiment of the invention. Note that traffic links (whether for speech or data) are shown as full lines, signalling links used only for call set up are shown as broken lines.

The onboard part 2 (shown in more detail in FIG. 2) comprises a handset 25 (or, in the alternative arrangement of FIG. 3, the user's own cellular telephone handset 31), connected to a termination point 20 of the satellite network. The termination point 20 is in communication with a ground station 4, shown in more detail in FIG. 4. In this embodiment, the communication link is made through an earth-orbiting satellite 6.

The principal components of the ground station 4 relevant to this invention are an antenna 44 which communicates, by way of the satellite 6, with the onboard system 2, an Access Control and Signalling Equipment (ACSE) 40 which carries out call switching functions to allow calls to be placed through the public switched telephone network (PSTN) 8 to other telephones 85, and a Card Management System 42 which identifies and authorises the use of individual terminals 20. Associated with the card management system there is an "aircraft location register" 41 which monitors the terminals currently served by each individual satellite, and modifies the functioning of the card management system when a terminal 20, for example on board an aircraft 2, moves from the coverage area of one satellite 6 (and its ground station 44) to another. There is also a register 43 of card identities, to provide a correspondence between the user identities used by the satellite terminal and the corresponding cellular telephone user identities (not necessary if the cellular telephone identity is read directly by the terminal 20, as will be described with reference to FIG. 3), and to provide billing information.

Figure 5:
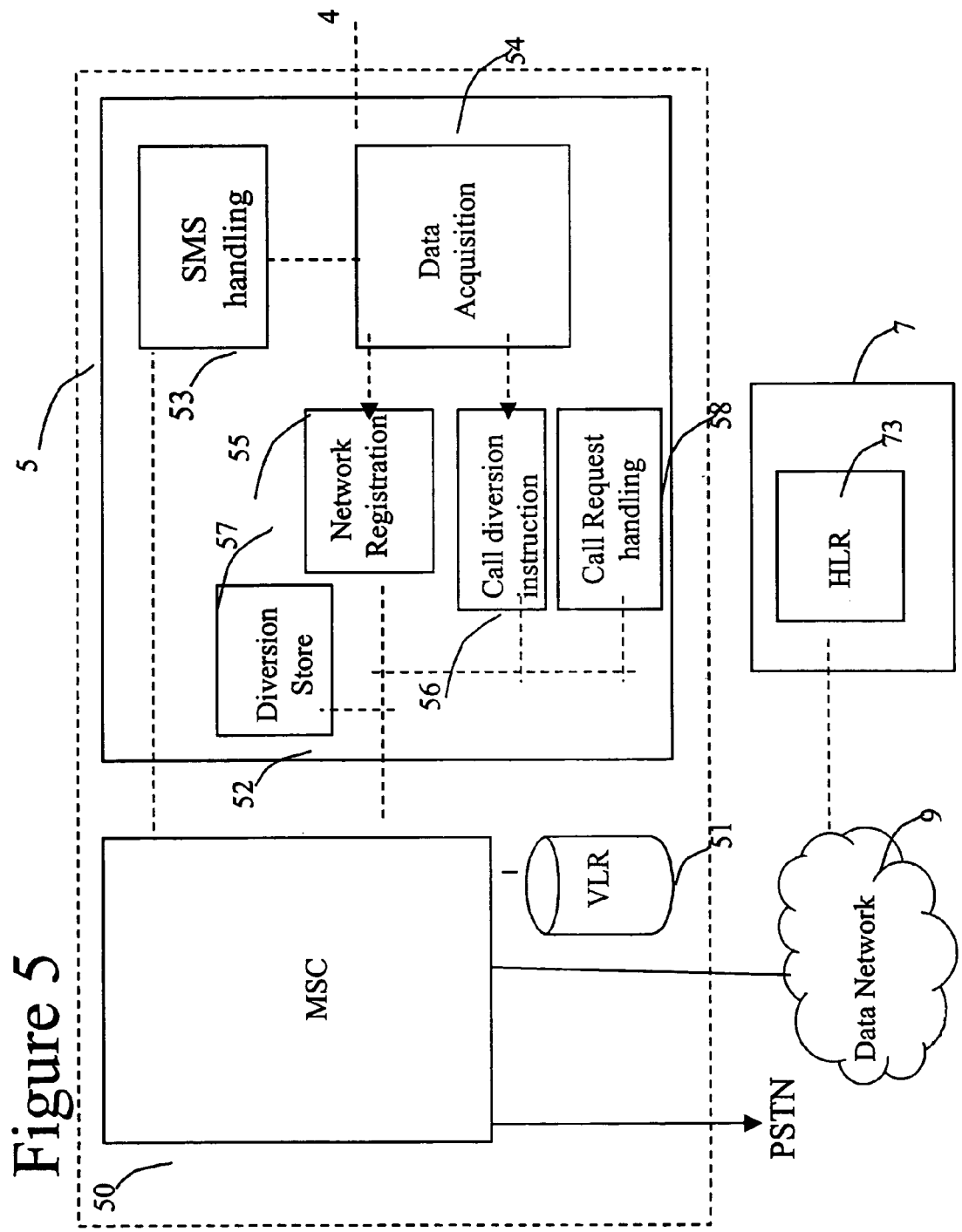
FIG. 5 is a schematic diagram of the switching system, interface unit, and associated parts of the second telecommunications system.

The card management system 42 interacts with an interface unit 52 of a "host" cellular telephone network 5, shown in more detail in FIG. 5. This network 5 is connected to the public switched telephone network (PSTN) 8, to other cellular networks 7, and to a data network 9, through a switching centre 50.

The cellular network 7 illustrates in simplified form the system architecture of a "GSM"-standard cellular radio system, and the terminology used in this standard. The network 7 has a switching system (MSC) 70 to allow connection of one or more base transceiver sites (BTS) 74, through one or more base site control systems 72, to the PSTN 8 and thus to other telephones 85. The cellular system is also capable of carrying data messages, for transmission over a packet data network 9, for example using the "SMS" ("Short Message Service") protocol which forms part of the GSM standard.

A mobile telephone 75 may establish radio contact with one of the base stations 74 in order to make and receive telephone calls. The network 7 also includes a "Visitor Location Register" 71, which maintains details of those cellular telephones 75 currently co-operating with the network 7. Mobile telephones according to the "GSM" standard are capable of co-operating with different networks ("roaming" between networks). To allow this to take place, when a mobile telephone 75 changes from one network to another, the network to which it has moved retrieves data from a "Home Location Register" 73 permanently associated with the handset 75. The network 7 in which the Home Location Register 73 associated with a given handset is to be found is identifiable from the handset's identity code. The Home Location Register also records the identity of the network 7 with which the mobile handset 75 is currently operating. Signalling between networks used for these functions, and at call set up, are also carried over the data network 9.

The "host" network 5 operates like conventional cellular network, but is provided with an interface unit 52, which interacts with the mobile switching centre 50 as a base site controller would. This interface unit 52 may be in addition to one or more base site controllers (not shown). The interface unit does not interact with any base transceiver sites or mobile handsets, but obtains user details (in particular the identity of a mobile handset) from the card management system 42 to allow it to appear to the switching centre 50, and the HLR 73 in the user's home network, that it is in radio communication with a mobile handset. It can then control the call forwarding instructions stored in the VLR 51, to cause incoming calls directed to that handset to be diverted, through the switching system 40 of the satellite network 4, to the satellite terminal 20.

Figure 2:
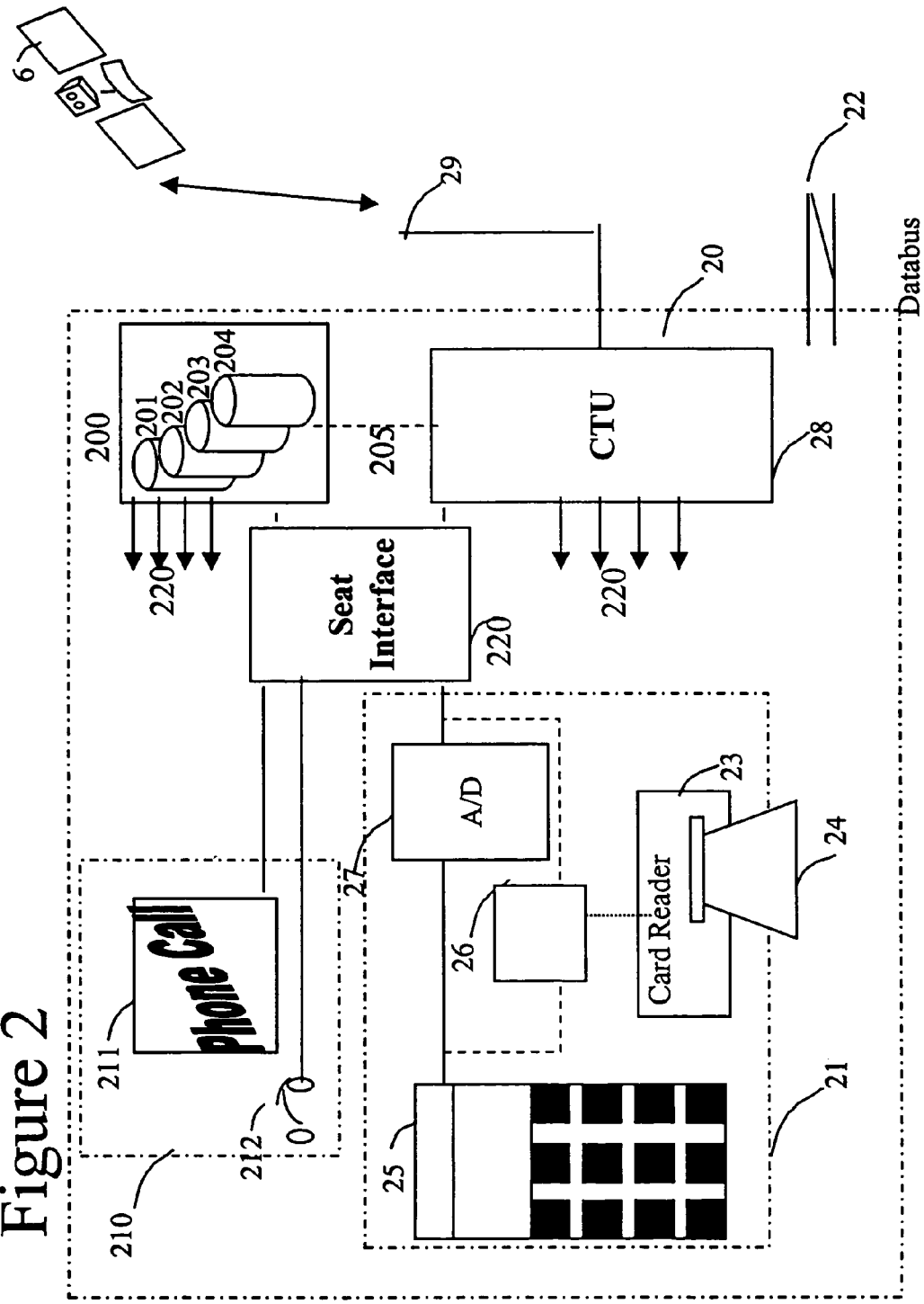
FIG. 2 is a more detailed schematic diagram of the network termination and associated card reading equipment, which for illustrative purposes will be assumed to be on board an aircraft.
Figure 3:
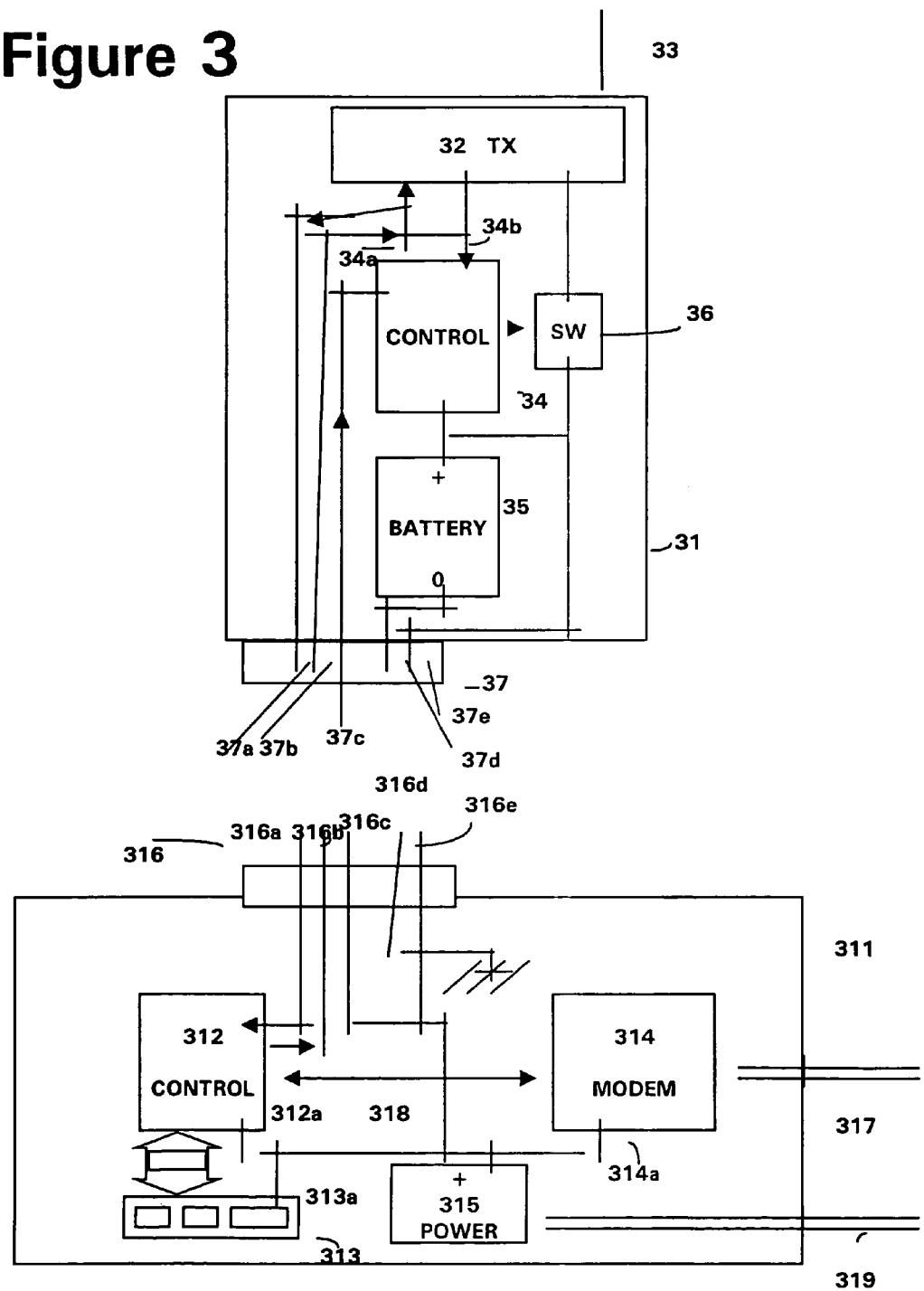
FIG. 3 is a diagram showing part of an alternative arrangement of network termination, arranged for co-operation with a cellular telephone handset.
Figure 4:
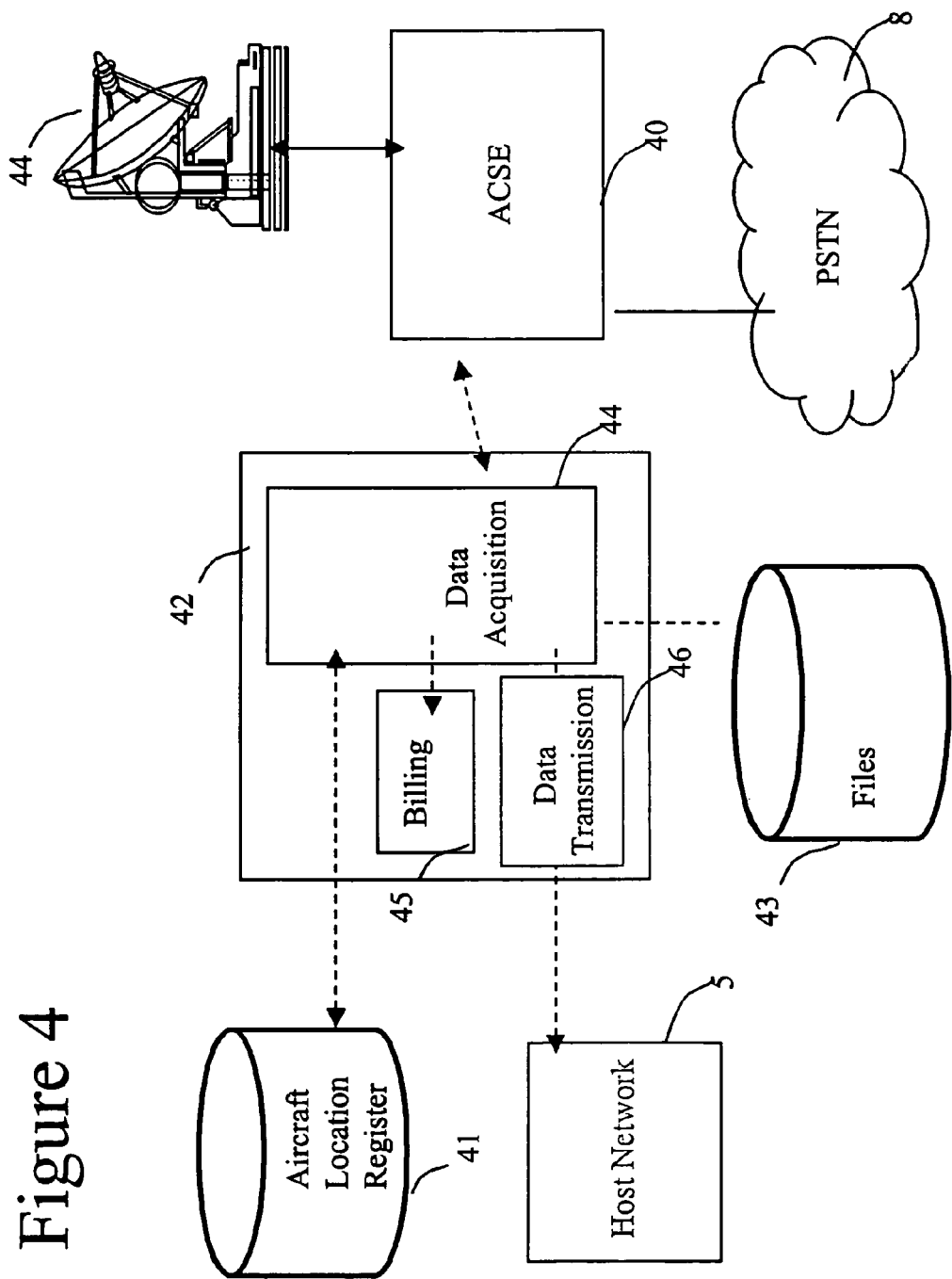
FIG. 4 is a schematic diagram showing the functional relationships between components of the fixed part of the first telecommunications system.

FIGS. 2, 3 and 4 illustrate embodiments of the first network of the invention, applied to a satellite telephone system such as that provided by the applicant company under the Registered Trade Mark "Skyphone". FIG. 2 shows a first embodiment of the mobile part for use with a standard card reader, whilst FIG. 3 shows an alternative arrangement which allows a user to use his cellular telephone handset. FIG. 4 shows the ground station.

The onboard system 20 shown in FIG. 2 comprises a multiplex and radio interface unit 28, which is connected through respective seat interface units 220 to a plurality of user terminals 21 (only one shown in detail). The interface unit is also connected to an antenna 29 which provides radio communication with a satellite 6 or a ground station. Each user terminal 21 has a card reading unit 23 into which an intending user can insert a card 24 or other data carrier providing user identification data. The data may give details of the user's credit card account, or a special account for the use of the onboard telephone service. The card reader 23 may be adapted to read the SIM (Subscriber Identity Module) of a GSM-standard cellular telephone.

The user handset 25 provides the usual keypad, microphone and earphone to allow the user to make telephone calls. Each seat interface unit 220 is also connected to an onboard entertainment system 200 controlling the aircraft's in-flight entertainment system. The onboard entertainment system 200 comprises a plurality of servers 201–204, accessible using the keypad 25, which are arranged to deliver audio, visual, and interactive services such as games and shopping services, by way of the seat interfaces 220, to individual user terminals 210, each provided with a screen 211 and a set of headphones 212.

The entertainment system 200 also has a connection 205 to the telephone interface unit 28 to allow the operation of an interactive server 203 which provides services such as on-line shopping services.

The user handset 25 and the card reader 23 are both connected to a processor 26 which converts data, which has been read from the card 24, and keystrokes which have been input from the handset 25, into data signals for transmission over the radio link 29. It also provides identification data indicative of which of the terminals 21 it is. A further processor 27 performs analogue/digital conversion of speech signals from the handset 25.

The digitised signals from each terminal 21 are multiplexed and modulated onto a radio carrier in the interface unit 28, and transmitted from the antenna 29.

The antenna 29 also receives signals, which are demodulated and demultiplexed in the interface unit 28. Data signals are processed in the processor 26, whilst digitised speech is converted to analogue speech in the analogue/digital convertor 27 and fed to the handset 25.

The interface unit 28 also includes a connection to the databus 22 of the aircraft 2 giving access to aircraft parameters such as "weight-on-wheels", time to destination, altitude, etc. When a predetermined condition indicative of the impending end of a flight is met, the central unit 28 transmits a signal to the ground station to cause a deregistration signal to be transmitted to the card management system 42.

Because the onboard telephone system was originally designed for making outgoing calls, the handsets 25 provided in existing terminals 21 are not equipped with a suitable call alerting device. The handsets 25 could be modified to provide a buzzer or light to alert the user to an incoming call, but this may be distracting to other passengers. Alternatively, the at-seat entertainment system 200, 210, 220 may be adapted to alert the user, as will now be described.

When the interface unit 28 detects a "ringing tone" signal indicative of an incoming call attempt for a specified termination point 21, it transmits a control signal, using the connection 205, to the audio/visual server 204 of the entertainment system 200. The ringing tone may be forwarded by the interface unit 28 to the server 204 to act as the control signal, or it may be terminated at the interface unit 28, a separate control signal being generated for forwarding to the server 204. The ringing tone may also be delivered to the handset 21 in the usual manner. The server 204 is arranged to respond to the control signal to generate a video and/or audio overlay for transmission to the headphones 212 or the screen 211 associated with the respective seat interface unit 220.

When the user responds to the alert by putting the handset in a condition to answer the call (going "off-hook"), an indication is sent to the interface unit 28 to connect the call through to the handset 21. The system is arranged such that this indication also causes the server 204 to cease giving the call alert indication. This may be achieved in one of the following ways.

The "off-hook" indication may be sent direct to the server 204 from the handset 21 by way of the seat interface 220. The server 200 then transmits a signal over the interface 205 to the telephone interface unit 28. The telephone interface unit 28 responds by transmitting an off-hook indication back to the ground station 4 and connecting the call to the handset 21.

Alternatively, the "off-hook" indication may be sent from the handset direct to the telephone interface unit 28, which connects the call to the handset 21 and transmits an "off-hook" indication back to the ground station 4. A control signal is sent over the connection 205 to the server 204 to cause the server to cease the "incoming call" display. This control signal may be the ceasing of the previous "ringing tone" signal.

In a third possible arrangement, the "off-hook" indication may be sent from the handset direct to both the telephone interface unit 28 and the server 204, which can each respond as indicated above without any further control signals needing to be sent over the interface 205.

Instead of the terminals 21, an alternative arrangement may be used as shown in FIG. 3. In this arrangement each onboard terminal 21 is replaced by an onboard interface device 311 to which a user's own mobile radio telephone 31 can be connected electrically, thereby allowing the mobile telephone to be used without using its radio antenna. It is a modification of the system described in the applicant company's International Patent Application WO97/36442, published on Oct. 2, 1997, to which the reader is referred for further details. In this modified version a GSM (Global System for Mobile communication) mobile telephone 31 comprises r.f. transceiver circuitry 32 coupled to an antenna 33, baseband signal processing and control circuitry 34, a rechargeable battery pack 35, a switch 36 and a socket 37. The processing and control circuitry 34 has a data output terminal coupled to both the r.f. transceiver circuitry 32 and a first contact 37a of the socket 37. A data input terminal 34b of the processing and control circuitry 34 is coupled to the r.f. circuitry 32 and a second contact 37b of the socket 37. A third contact 37c of the socket 37 is coupled to a control input of the processing and control circuitry 34. Fourth and fifth contacts 37d, 37e of the socket 37, which are respectively for 0V and +V power supply lines, power the telephone 31, and may also be arranged to recharge its batteries 35. The +V terminal of the battery pack 35 is also connected to the processing and control circuitry 34 and to an input terminal of the switch 36. The output terminal of the switch 36 is coupled to a +V input terminal of the r.f. circuitry 32. A control terminal of the switch 36 is coupled to an output of the processing and control circuitry 34.

A interface unit 311 comprises a control circuit 312, a user input unit 313, including a keypad and a display, a V.24 33.6 kbit/s modem 314, a power supply unit 315 and a plug 316. The plug 316 has five contacts 316a–316e which correspond to contacts 37a–7e of the socket 37 of the mobile telephone 31. The first contact 316a of the plug 316 is coupled to a data input terminal of the control circuit 312 and the second contact 316b of the plug 316 is coupled to a data output terminal of the control circuit 312. A bi-directional serial link 318 is provided between the control circuit 312 and the modem 314 for modem control and data signals. The third contact 316c and fifth contact 316e of the plug 316 are coupled to the +V output of the power supply unit 315. The fourth contact 316d of the plug 316 is coupled to the interface unit's 0V supply wiring. The user input unit 313 is coupled to the control circuit 312 for the input of user commands and the output of display control signals from the control unit 312 to the user input unit 313. The +V output of the power supply unit 315 is also coupled to +V input terminals 312a, 313a, 314a of the control circuit 312, the user input unit 313 and the modem 314. The modem 314 is coupled to a telephone line 317 and the power supply unit 315 is arranged to receive power from an electricity supply 319.

When the user wishes to connect to the interface unit 311, he connects the plug 316 of the interface unit 311 to the socket 37 on his telephone 31 by a cable (not shown). The voltage on the third contact 37c of the socket 37 is detected by the processing and control circuitry 34 which thereby determines that the telephone 31 has been connected to the interface unit 311. The connection of the battery 35 to the power supply 315 by way of the connections 37d/316d and 37e/316e also allows the battery to be recharged.

Once the processing and control circuitry 34 has determined that the telephone 31 has been connected to the interface unit 311, it sends a control signal to the switch 36, causing it to open, isolating the r.f. circuitry 32 from the battery pack 35 and the power supply 315 in the interface unit 311. The processing and control circuitry 34 also responds to the voltage on the third contact 37c of the socket 37 by selecting alternative control programs or constant data to allow for delays in the signal path from the telephone 31 to the controller 30 which are caused by the use of the satellite link 6 and the modems 314, 32.

In this arrangement, instead of the need for a separate card reader 23, the telephone 31 identifies itself to the telephone network 40/42 by generating its terminal identity code (IMSI in the case of a GSM telephone). The registration signal is not transmitted from the antenna 3 because the r.f. circuitry 32 is disabled. Instead, it is output to the interface unit 311 via the first contacts 37a, 316a of the socket 37 and plug 316.

The handset 31 may be designed such that ringing is inhibited when installed in the interface unit, or the user may switch ringing off manually, allowing call alerting to be carried out through the in-flight entertainment system 200, 210, 220 as already described.

The operation of the onboard system will now be described with reference to FIG. 6. When the card reader 23 or interface unit 311 detects the presence of a card 24 or handset 31 respectively, (step 601) it may generate a prompt to indicate to the user that he may wish to have calls diverted to the onboard system. If the user requires this service, he enters a code on the keypad of the handset 25, 31 which causes a divert request to be generated (step 602). The details from the card 23 (or SIM of the handset 31) are then passed to the processor 26, which also provides the identity of the terminal 21 (step 603) and transmits the data to the central unit 28. The central unit 28 then transmits the data to the ground station 4 (step 604). The further steps (605–616) in the process are carried out by the co-operating networks 4, 5 and will be described later.

The user may decide that he no longer wishes to have his calls diverted to the terminal 21. In order to cancel the diversion instruction he may enter a special code on the keypad of the handset 25, 31. Disconnect codes may also be generated in the central unit 28 for all the termination points 21, either by the cabin crew or automatically in response to a signal detected on the aircraft's databus 22 which is indicative of the imminent end of the journey, such as weight on wheels, low altitude, or time remaining to destination as determined by the aircraft's flight management system. The disconnect instruction is transmitted (step 801) by way of the switching system 40 in the ground station 4, to the interface unit 52 whose operation (steps 802 to 805) will be described later.

The Ground Station 4 shown in FIG. 4 has a radio antenna system 44 for communicating with the terminal 20, through a satellite link 6 or otherwise. Signals are handled by an Access Control Signalling Equipment (ACSE) 40 which carries out switching functions to route calls to or from the public switched telephone network (PSTN) 8. An aircraft location register 41 stores identification details for all aircraft 2 (and therefore all terminals 21) currently served by the ground station 4. When an aircraft passes into the control of a different ground station (or satellite in a satellite system) the aircraft location register in the second ground station acquires the aircraft details.

A card management system 42 comprises a data acquisition unit 44 which reads data transmitted from the card reader 24 to identify the type of card, confirm the user's account details and arrange billing for any calls made, through a billing system 45 which raises invoices, or interacts with the systems of a credit card operator or bank.

In the existing onboard systems a user cannot receive calls, unless the caller knows the unique "AES" number of the handset 20. This number depends on the identity of the aircraft, the seat, and the serving satellite or base station, none of which are likely to be known to the calling party.

The conventional ground station equipment just described is augmented in the present embodiment by a store 43, which stores a concordance between the card identities and the card-holder's cellular radio telephone number (MSISDN: mobile systems integrated services data network number), on request from the data acquisition unit, which is arranged to recognise the card identities which require such translation. This arrangement allows the existing card readers 23 to be used on board the aircraft, without modification. In a preferred embodiment the concordance is supplied to a register 43 in the ground station by the operator of the user's home network 7, when the network operator provides the user with the card. The operator of the home network 7 also records the concordance in its own Home Location Register 73. This may be done by manual data capture or by means of a data link (not shown) between the register 43 and the Home Location Register 73. If the terminal (e.g. 311) can read users' mobile subscriber identities directly, the store 43 can be omitted. Billing information is also returned to the user's home network 7.

The operation of the ground station will now be described with reference to FIG. 6. The data acquisition unit 45 receives the card details from the reader 23 (see steps 601 to 604 already discussed) and if it identifies those details as corresponding to a cellular user (step 605), it retrieves the cellular user identity from the store 43 containing this concordance, or from the HLR 73 of the user's home network, (step 606). (This step can be omitted if the user's mobile network identity is read by the onboard apparatus 21).

A data transmission unit 46 then generates a signal indicative of the cellular user identity, together with the identity (directory number) of the terminal 21, for transmission, over the data network 9 or a dedicated link 99 (as shown), to the cellular network 5 acting as host to the interface (step 607). The host network 5 will, in general, not be the same as the user's home network 7. The further steps (608 to 616) in this process will be described later, with reference to FIG. 5. For reasons to be explained later, a data network address identifying the at-seat entertainment terminal 210 corresponding to the same seat as the terminal 21 is also provided by the data transmission unit 46.

If a cancellation signal is received from the aircraft in respect of a given terminal 20, (step 801) the data transmission unit 46 transmits a "cancellation" signal to the host network 5. As already discussed, the cancellation signal may be generated either for an individual handset 21, by its user dialling a special code, or for all handsets as the result signals received by the radio interface unit 28 over the aircraft's databus 22 indicative of the imminent end of the flight.

An embodiment of the host network 5 of the invention is shown in FIG. 5. Its operation will be discussed with reference to FIGS. 6, 7 and 8. In this network 5 an interface unit 52 is provided, which is arranged to appear to the switching system 50 as if it is a normal base station of the cellular radio system.

Figure 6:
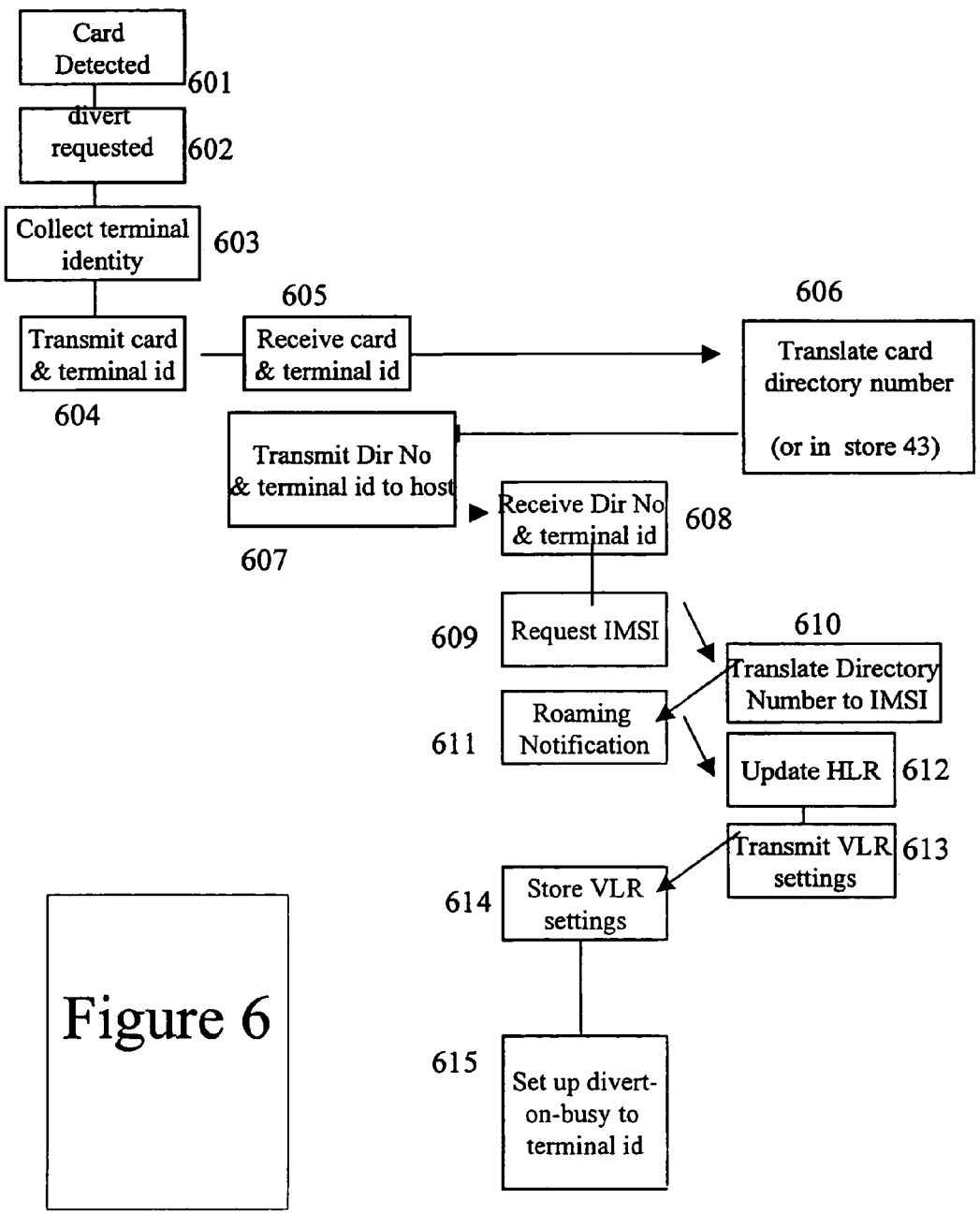
FIG. 6 is a flow chart showing the process by which a diversion is set up in the second network to a termination connected to the first network.
Figure 7:
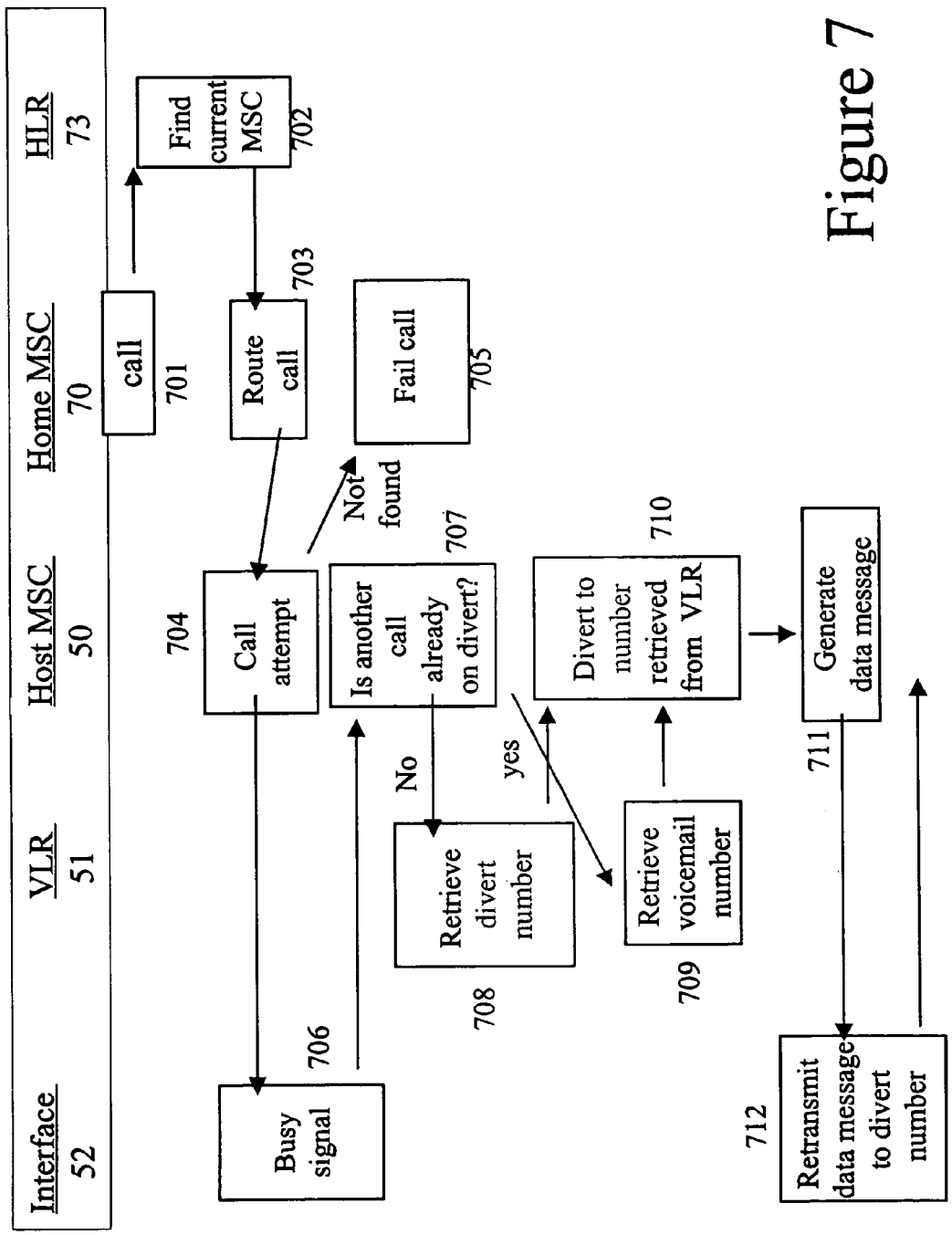
FIG. 7 is a flow chart showing the process by which a call coming in to the second network is connected to a telephone connected to the first network.

In order to do this, the interface unit 52 is provided with a data acquisition unit 54 which receives from the card management system 42 of the ground station 4 the identity of the cellular telephone it is to represent, and the AES identity of the onboard terminal 20 (step 608, FIG. 6). Mobile telephones have two identification codes: the directory number (MSISDN) and the actual SIM identity (IMSI). In practice, for security reasons, the IMSI is not made generally known, and a user is identified by his MSISDN unless the SIM itself is used. Therefore, unless the SIM is used in the card reader 23, or the user's telephone is used in the arrangement of FIG. 3, (in which case no concordance is required) the data acquisition unit 54 will receive the MSISDN, and not the IMSI.

However, the GSM standard does allow a switching system to obtain an IMSI from the Home Location Register 73, given an MSISDN. This facility is provided in order to obtain routing information for data messages, which cannot be sent over the public switched telephone network (PSTN). To do this, the interface unit 52 transmits a "request for routing information" for the user's MSISDN (step 609). The HLR 73 responds to such a request with a signal which includes the IMSI corresponding to the MSISDN in the request (step 610).

The telephone identity (IMSI), whether obtained directly from the card reader 23 or handset 31, or indirectly as just described, is passed to a network registration unit 55 which exchanges signals with the mobile switching centre 50 in the same way that a real cellular telephone would do. The mobile switching centre therefore informs the user's Home Location Register 73 that the mobile telephone is now registered with the network 5 (step 611). The Home Location Register 73 records that the mobile handset is now registered with host MSC 50 (step 612).

It should be noted that, although registered with the host MSC 50, the user's mobile handset is not operatively connected to the host MSC 50—indeed, the mobile handset may be switched off to allow the card 24 to be used, or it may be connected to a user terminal 311. The user may be in an aircraft, anywhere in the world within the coverage area of the network of satellites 6.

The user's details, including any diversion instructions, are sent by the Home Location Register 73 to the network's VLR 51 (step 613). A store 57 records a copy of the details of these diversion instructions (step 614).

Conventionally, any incoming calls for a mobile user are sent in the first instance to the user's home network 7, and the HLR 73 provides information to identify the MSC 50 where the mobile handset can currently be found. Consequently, in the present arrangement, any incoming calls intended for the mobile user will now be directed to the network 5, as the mobile user is currently registered there.

The data acquisition unit 54 in the interface 52 now passes the directory number of the termination point 21 to a call diversion instruction unit 56, which generates a "divert on busy" instruction to the VLR 51 (step 615). This is a standard divert arrangement, and operates such that should the mobile unit appear to be engaged on another call when a call attempt is made to it, the call attempt is diverted to a specified directory number, in this case the termination point 21. This diversion instruction replaces any previous instruction held in the VLR 51.

Of course, there is in fact no mobile telephone connected to the interface unit 52, and therefore it is unable to connect incoming calls to the mobile telephone in the conventional way, or to identify the current true operating condition (switched off, busy, ready for calls, etc) of the mobile handset. Instead, the system responds to a call attempt as will now be described with reference to FIG. 7.

When a call attempt is made (step 701), the home MSC to which the call is initially routed obtains from the HLR 73 the current location of the mobile telephone (step 702), and on receiving the identity of the host MSC 50 (step 703), directs the call there (step 703). The host MSC 50 in turn transmits the call attempt to the currently serving base station, which is in fact the interface unit 52 (step 704). If the disconnect procedure (to be described later with reference to FIG. 8) has been carried out, the call will fail (step 705) and a signal is transmitted back to the home MSC 70. Otherwise, call attempts received by the interface unit 52 are handled by a call request handling unit 58, which automatically returns a "busy" signal to any such request (step 706). The MSC 50, on receiving the "busy" signal, checks whether any incoming call currently in progress to that mobile handset has already been diverted (step 707). (This is a standard procedure, to ensure that the call diversion will actually succeed). If there is no such diverted call in progress, the MSC 50 retrieves the diversion information from the VLR 51 (step 708) allowing it to route the call through the PSTN 8 to the user terminal 21 (step 710).

If a second call attempt is made, the MSC 50 will identify that the divert instruction will not work as it is currently handling a diverted call to that number (step 707). The normal default condition in such cases is to arrange for the second call to be diverted to the user's voicemail address (not shown) in his home network 7, (step 709, 710). The user is also sent a data message (in SMS format) to inform him of the new voicemail message. This message would normally be sent to the mobile unit, which appears to the MSC 50 to be co-operating with the interface unit 52, so the MSC 50 transmits the data message to the interface unit 52 (step 711).

In order to inform the user of the new voice mail message, the interface unit 52 must now forward the data message to the user terminal 21 (step 712) either during the call or after it ends. However, data messages are not suitable for switching via the MSC 50 and PSTN 8, nor for handling by the on-board terminal 21 as it is only equipped for voice.

Because the IMSI is recorded in the HLR 73 as being registered with the "Virtual" BSC, or interface unit, 52, any other data messages intended for the user will also be routed to the interface unit 52, and require forwarding to the user.

Figure 10:
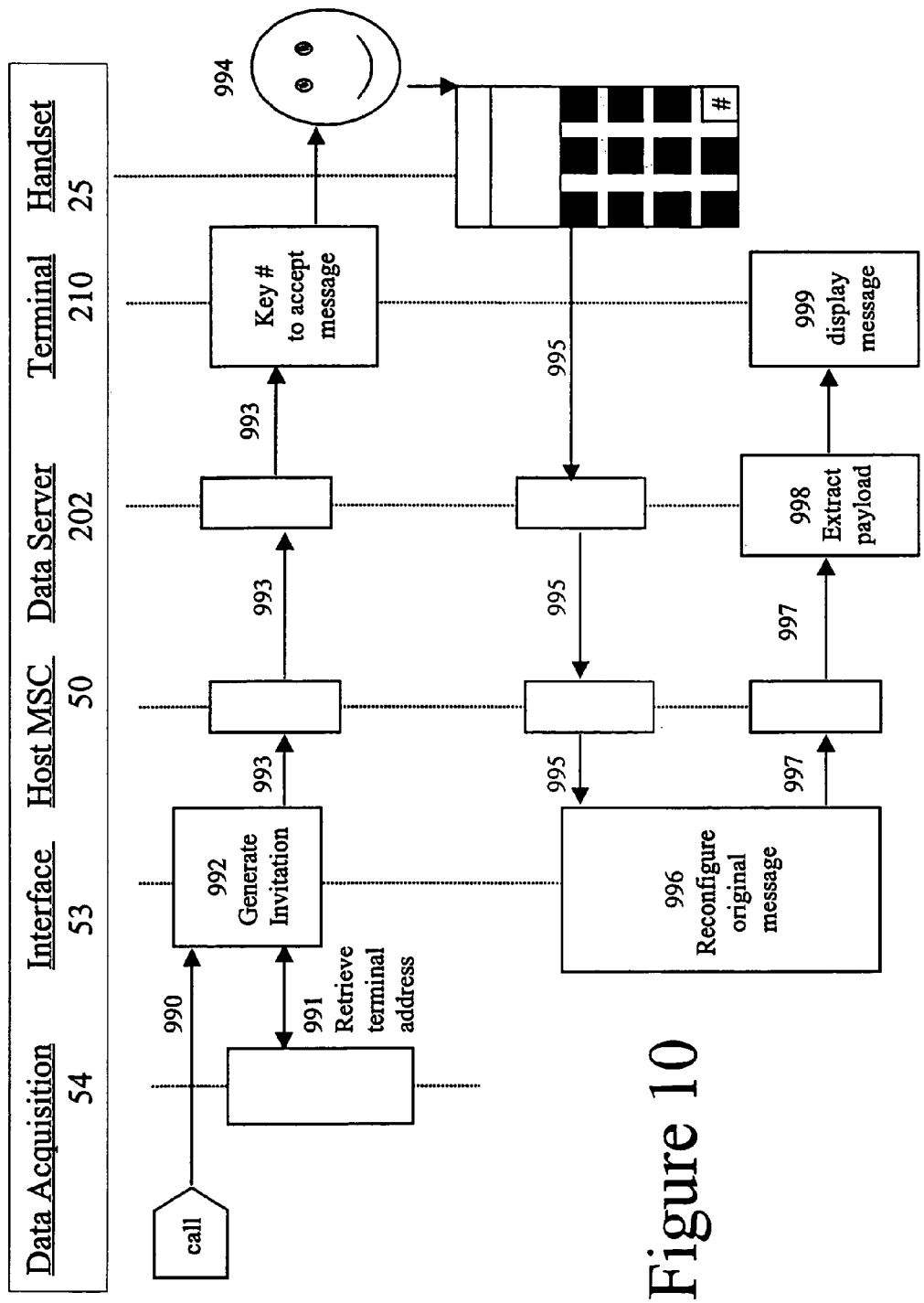
FIG. 10 illustrates a conditional forwarding process for a data message.

The present invention provides a way for such data messages to be re-routed to the user on an aircraft 20. In order to forward such messages, the interface unit 52 is provided with a data handling processor 53 for receiving data messages received over the packet data system 9 by way of the MSC 50 and intended for users currently associated with the interface unit 52. These messages include SMS messages sent from other callers, and SMS messages generated by the MSC 50 itself to alert the user that a message has been sent to the voice mail system. The format of such a message is shown in FIG. 9, and the process of sending and receiving it is shown in FIG. 10.

The original message basically consists of a data payload 901 and an address 902, which is the IMSI of the destination mobile telephone (FIG. 9*a*).

When the interface unit 53 receives such a data message (step 990) it retrieves from the data acquisition unit 54 the data network address of the at-seat entertainment terminal 210 corresponding to the user's cellular identity which was originally provided to the data acquisition unit 54 when the user carried out the registration procedure (step 991). The interface unit 53 next generates a data call to that address (step 992), in a form suitable for transmission by the MSC 50 (step 993) over the packet data network 9 to the aircraft, with an address header corresponding to the data network address of the user's at-seat terminal 210. This data call may be a short message to indicate that a message is awaiting delivery, and displaying on the screen 211 an invitation to the user to dial a special code on his handset 25 to accept the message (step 994), and any charge associated with it. This acceptance is transmitted back, by way of the MSC 50, to the interface unit 53 (step 995). (These steps 992–995 may be omitted if it is not required for users to acknowledge acceptance before receiving a data message).

The interface unit 53 then replaces the address header (the IMSI) 902 in the original data message with a code 912 identifying the terminal 210 and encapsulates the message in a form suitable for transmission over the packet data network 9 to the aircraft (step (996), with an address header 910 to send it to the data network interface 202 of the onboard entertainment system 200. It can thus be transmitted to the data interface 202 over the packet data network 9 (step 997), effectively as a packet with an address header 910 and a payload made up of the at-seat terminal number 912 and true payload 901 (FIG. 9*b*).

On receipt of the data message, the data server 202 extracts the data message payload 901, 912, (FIG. 9*c*) (step 998) and identifies the individual at-seat terminal 21 identified by the address 912. It can then activate the video display server 204 to display the data message payload 901 on the screen 211 of the appropriate terminal 210 (step 999).

If password protection is required, for example to ensure that the user is present when the message is displayed, the payload 901, 912 can also include a password code 913, which causes the server 202 to withhold the remainder of the payload until a predetermined sequence of keystrokes has been entered by the user in the terminal 21.

As the termination 21 is itself mobile, being on board an aircraft, call routing to that termination may require revision from time to time. For example, the "Inmarsat" satellite system comprises five geostationary satellites, which each provide cover for part of the earth's surface. These areas of coverage overlap to a large extent, but nevertheless on a long flight the aircraft may pass out of the area covered by one satellite into that served by another. This causes a small but significant change in the network address of any terminal 21 on board the aircraft. The aircraft location register 41 monitors the identity of all aircraft currently being handled by the ground station 4. When it acquires a new aircraft, it instructs the card management system 42 send an instruction to the interface unit 5 in the host network. The call diversion instruction unit 56 responds by transmitting a new call diversion instruction to the VLR 51, so that any further incoming call attempts are diverted to the new network address of the terminal. Note that the diversion store 57 is not updated. Note also that this does not affect calls already in progress. There is usually sufficient overlap in coverage areas that handover from one satellite or base station to another can be arranged to take place when no call is in progress.

Since the system causes the generation of an IMSI from the interface unit 52, instead of from the mobile telephone to which that IMSI relates, the mobile telephone should be switched off, or connected to an onboard interface device 311 which disconnects the radio circuits, to prevent the network detecting the IMSI in two places, which would disrupt the call routing processes in the HLR 73 and elsewhere. (Generally, the detection of the same IMSI from two sources causes the HLR 73 to disconnect both callers as a fraud prevention measure). If the user is on board an aircraft, he should not be using his mobile handset in the conventional manner, and so there should be no problem. However, if the user, having left the aircraft, switches on his telephone 75 when the network 5 has not reported a loss of the mobile unit from its own network, the mobile unit may be perceived by the HLR 73 as being registered with two networks at once. To avoid this possibility, a disconnection procedure is followed as described with reference to FIG. 8.

To stop calls being diverted to the user termination point 21, and restore the original call diversion settings, a disconnection signal is transmitted from the user terminal system 20 to the card management system 42 and thus to the interface unit 52 (step 801). The disconnection signal may be activated by a special code entered by the user, or it may be generated automatically by data indicative of the imminent end of the flight. Note that this disconnection signal merely controls the interface 52—it has no effect on any call already in progress, which is routed from the MSC 5 by way of the PSTN 8.

The disconnect instruction is received by the interface unit 52 (step 802) and causes the call diversion instruction unit 56 to retrieve the call diversion data stored in the store 57 (step 803) and generate a call diversion instruction restoring the original settings in the VLR 51 (step 804). This ensures no further calls are routed to the onboard terminal 21.

The interface unit 52 next causes the network registration unit 55 in the interface unit 5 to instruct the MSC 50 that the user is no longer connected to the network 5 (step 805). This allows the mobile unit to register with another network 7 in the normal way. Call attempts to the user number will continue to be routed by the Home HLR 73 to the MSC 50 with which the mobile unit was most recently registered, but as the MSC cannot now find the mobile unit, any such incoming call will return a "not found" signal to the home MSC 70 (step 705) which will divert the call according to any diversion instructions set up, or fail the call. Alternatively, the host MSC 50 may handle the diversion itself if the mobile unit is "not found", using the original diversion instructions now in the VLR 51, having been retrieved from the store 57 (step 804 above).

Having left the aircraft, the user may switch on his mobile telephone 75, which will register with the local network (e.g. 7) and will retrieve the original divert information from the HLR 73 (note that in general the HLR 73 will not be in the same network), and will cause all data relating to the user to be deleted from the VLR 51 in the "host" network 5.

Figure 11:
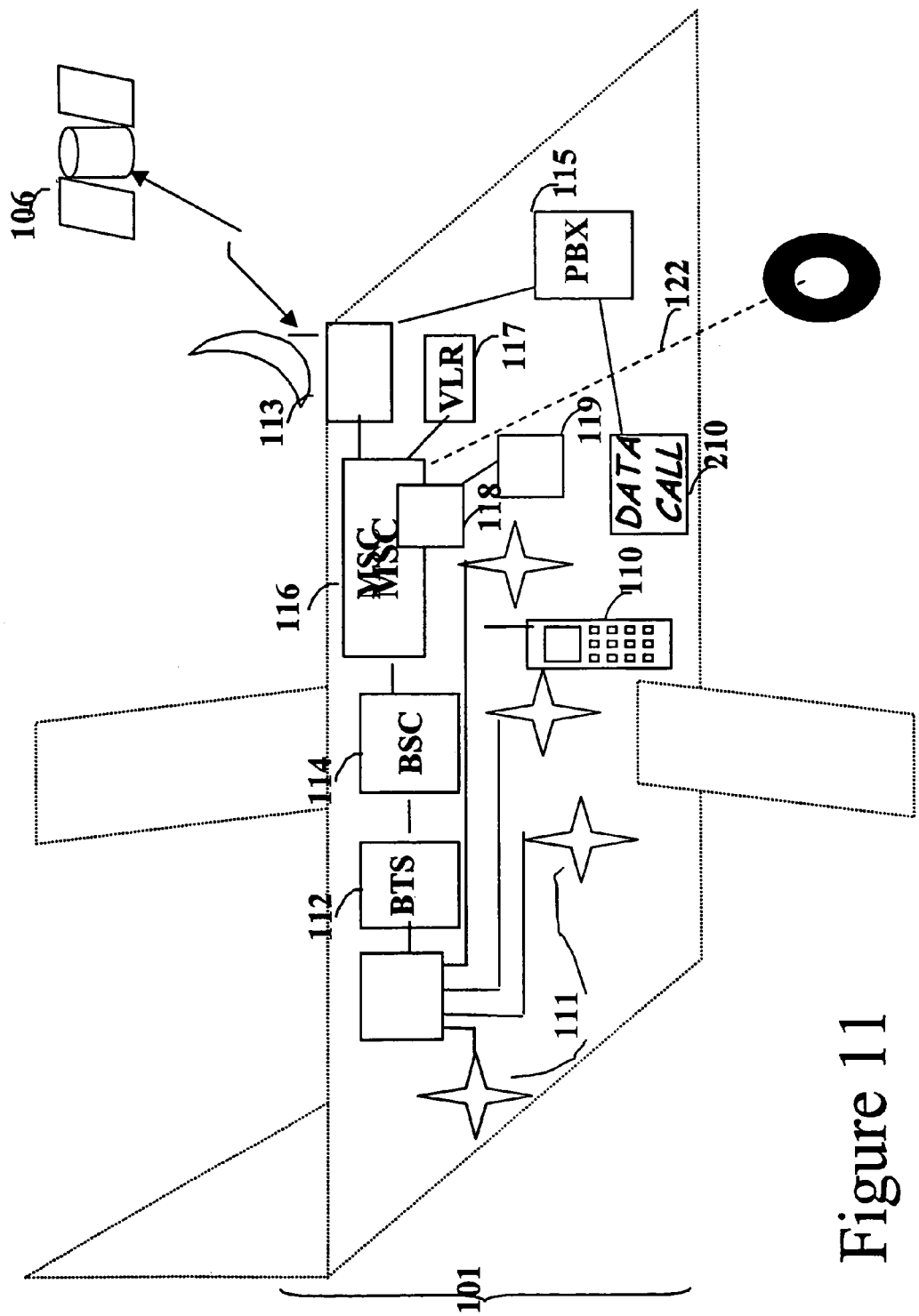
FIGS. 11 and 12 illustrate the alternative system disclosed in the applicant's application having the reference A25941 referred to above, to which the invention may also be applied.
Figure 12:
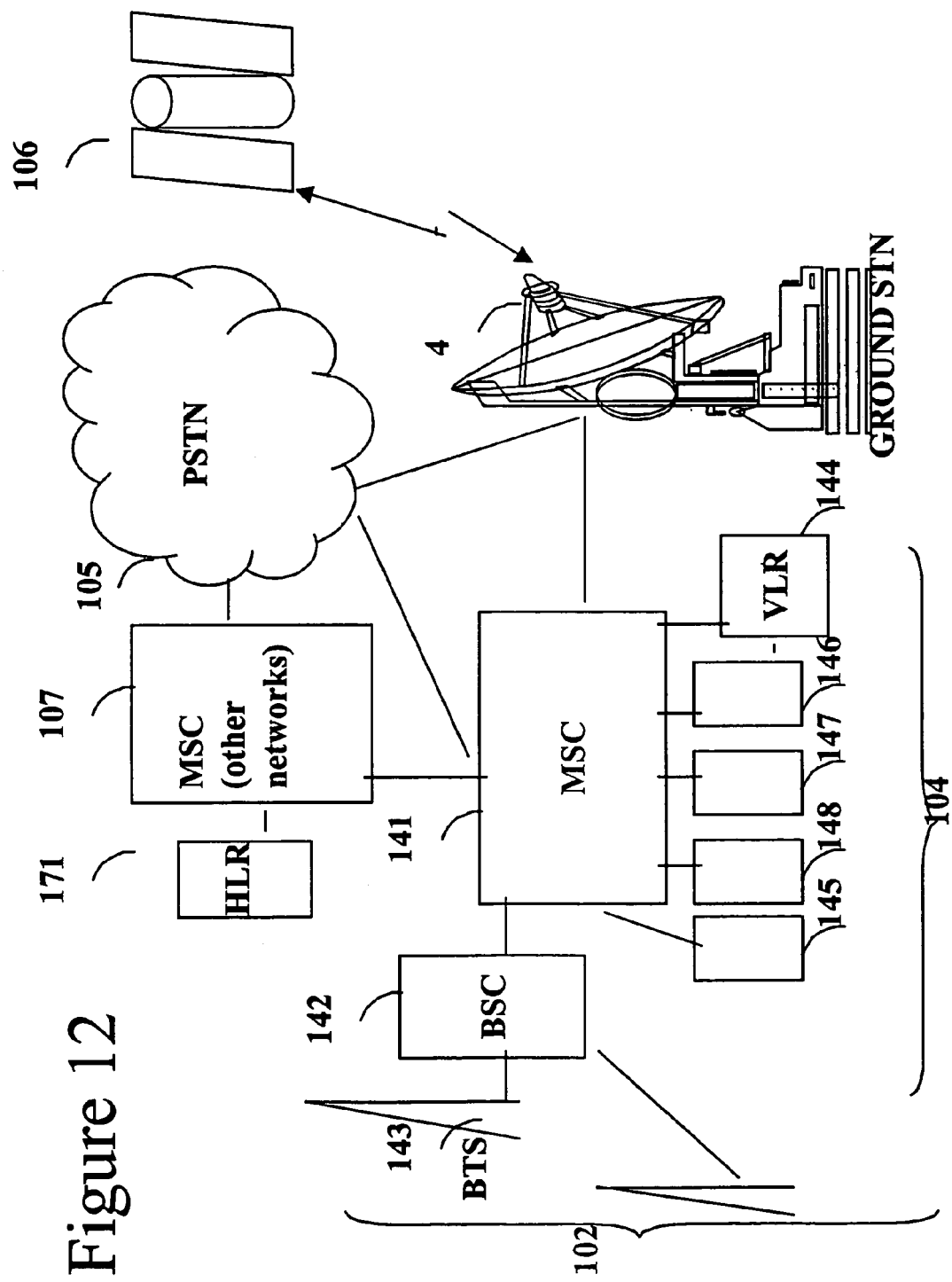

An alternative embodiment, in which voice calls are handled by a user's cellular handset but data calls and call alerts are still handled by the onboard in-flight entertainment system, is depicted in FIGS. 11 and 12. The system can be categorised into two main components: namely the onboard part 101 (FIG. 11) and the fixed part 102 (FIG. 12), comprising the satellite ground station 4 of the tracking radio system and the "host" cellular network 104, communicating with each other through a satellite connection 106. The onboard part (FIG. 11) comprises a moveable cellular system 111,112,114,116 and the moveable part 113 of the tracking radio system. The fixed part 102 (FIG. 12) is itself in two parts, namely a satellite ground station 4, which is similar to that shown in FIG. 1, and the fixed "host" cellular network 104, which is a public land mobile network (PLMN). 104, in turn interconnected with other PLMNs 107 and conventional wired networks (PSTN) 105 to allow calls to be made between users of different networks.

As shown in FIG. 11, the system provides a cellular radio subscriber with the ability to use his own handset 110 aboard an aircraft, located anywhere within an agreed satellite coverage area. The coverage on board the aircraft can be provided by any suitable means, using known radio repeater distribution systems 111 to provide radio coverage wherever required.

The distribution system 111 is fed by a base transceiver site 112, served by a base site controller 114 and a mobile switching centre 116, which has its own visitor location register 117, for onward transmission to the satellite ground station 4 via a satellite tracking system 113. The satellite tracking system may be a conventional satellite telephone system as commonly used for ship-to-shore communications, and for the airborne systems previously referred to, providing a satellite link 106 from the aircraft or ship's satellite tracking system 113 to the satellite ground station 4. The satellite ground station 4 is in turn connected to the mobile switching centre (MSC) 141 of a conventional cellular telephone system, referred to hereinafter as the "host" system 104 and shown in FIG. 12.

The satellite link 4-106-113 is therefore between an MSC 41 (the "host" MSC) of the land-fixed "host" network 104 and the onboard MSC 16. The user record in the HLR 71 identifies the mobile unit 110 as currently served by the land-based network 104, and routes the call to the host MSC 141, which will in turn recognise from its entry in the land based VLR 144 that this mobile unit is currently being served by the onboard MSC 116. The way this is arranged will be described later.

This arrangement allows integration of the onboard MSC 116 with the onboard switching capability associated with the conventional satellite telephone system and the aircraft's internal communications system 115. In particular it provides a simple means of providing passengers and crew with a "Wireless PBX" facility, as users on board the aircraft can communicate with each other through the BSC 114 without using the satellite link 4-106-113. When a call is made by a cellular telephone 110, the onboard MSC 116 first consults its VLR 117 to establish whether the called party is currently served by the same MSC 116. If this is the case, it connects the call without the use of any inter-MSC links. Thus calls made between two users both on board the aircraft 101 may be made without the use of the satellite link 4-106-113. The satellite connection provides several voice channels and a signalling channel (supervisory control—management channel), and can be made by any connection of appropriate capacity.

The host network 104 may support one or more further base site controllers 142 controlling conventional base transceiver sites 143. The Mobile Switching Centre 141 also has an associated "Visitor Location Register" 144 which, in conventional manner, records details of the cellular telephones currently co-operating with the Mobile Switching Centre 141, so that details can be exchanged with the Home Location Register 171 of the user's home network for billing purposes, and to allow incoming calls to the handset 110 to be routed correctly. These details include the identity of the link 4, 142 to which the user is connected, allowing different call charges to be applied for use in different cells, and in particular for calls made through the onboard base transceiver site 112.

In the cellular mobile network 104, standard GSM functionality is used. Users aboard the aircraft will be able to use this service provided they are subscribers to the host network 104, or any other network 107 which has a "roaming" agreement with the host network 104, provided the subscriber has the roaming capability authorised by his service provider.

In this embodiment of the invention, the "host" network 104 operates like a conventional cellular network, but is provided with an interface unit 148 for interworking with the satellite ground station 4. This interface 148 allows the switching centre 141 to obtain user details (in particular the identity of a mobile handset) from the satellite system 4 to allow it to appear to the network 104, and thus to the HLR 171 in the user's home network, that the mobile handset is in radio communication with a base station under the control of the mobile switching centre 141 when in fact it is in communication with the onboard MSC 116. The mobile switching centre can then arrange for call forwarding instructions to be stored in the VLR 144, to cause incoming calls directed to that handset to be diverted, through the switching system 130 of the satellite network 4, to the onboard MSC 116.

The operation of the system is as follows. When a mobile unit 110 first makes contact with the onboard cellular system 101 it transmits its identity code (IMSI) to the onboard MSC 116 in the usual way. The onboard MSC 116 can obtain verification data from the user's HLR 171 (identified by the IMSI code) to verify the authenticity of the user, and permit outgoing calls. However, because the onboard MSC 116 is only contactable through the satellite system, incoming calls to the mobile unit 110 cannot be reliably routed to the onboard MSC 116 over a conventional link. In order to avoid a requirement for special facilities in each network 107 it is convenient to make the mobile unit 110 appear to be working to a conventional mobile switching centre 141.

When the onboard MSC 116 detects a call attempt or registration attempt from a mobile unit 110, it collects from the mobile unit its identity code (IMSI) and passes it to a processor 118. If the processor 118 has not previously done so, it generates a temporary onboard identity for association with the mobile identity code (IMSI), and stores it in a memory 119. For aircraft fitted with at-seat satellite telephone equipment, each handset has an identity code (generally related to the number of the passenger seat to which the handset is fitted) to allow outgoing calls to be billed to the correct user and to allow the system to be used to communicate between passengers. Spare numbers in this system (referred to herein as "pseudo seat numbers"—PSN) may be used as the temporary onboard identities allocated to mobile handsets working to the onboard MSC 116. If the mobile handset 110 has previously contacted the onboard MSC 116, and not subsequently de-registered, the processor 118 now retrieves the PSN corresponding to the IMSI from the memory 119.

As with the arrangement of FIG. 1, the present embodiment allows the host network to translate the called party's IMSI to an AES code, which in this case is a pseudo-seat number (PSN) allocated randomly from the numbers left spare after codes have been allocated for at-seat terminals. The translation takes place in the host network, without the need for the caller to know the AES code. The temporary onboard identity code PSN associated with the called party's IMSI is returned to the onboard MSC 116 which sets up a call over the satellite system to the host MSC 141 of the host network 104. The satellite system requires certain authentication data on call set up, namely the AES code and a subscriber identity code which normally identifies an individual subscriber to the satellite system or, if the user does not have an account with the satellite system, credit card details or other details to allow payment to be made. In the present case the onboard MSC 116 provides the cellular telephone's code (IMSI) as the subscriber identity code. For security reasons, this code may be encrypted. If an outgoing call attempt is being made, a call attempt is then made to the number dialled; otherwise a special code, referred to herein as the non-call code ("NCC") is used.

If the caller has not previously been registered, but a special non-call registration code is used, the ACSE 40 of the ground station 4 recognises it as being an authorised free call to the host MSC 141 and routes it accordingly. Calls using this code are permitted even if the IMSI has not previously been registered with it.

The host network 104 will, in general, not be the same as the user's home network 107. In the host network 104 an interface unit 148 provides certain additional functionality to co-operate with the satellite ground station 4.

When a call is received from the satellite ground station 4 using the non-call code (NCC) the host MSC 141 routes the call to an interface unit 148, which retrieves the identity (IMSI) of the cellular telephone, and the PSN associated with it. The IMSI (de-encrypted if necessary), is passed to a network registration unit 145 which exchanges signals with the host mobile switching centre 141 in the same way that a real cellular telephone would do if registering through one of its base stations 143. The mobile switching centre therefore informs the user's Home Location Register 171 that the mobile telephone is now registered with the network 104. The Home Location Register 171 records that the mobile handset is now registered with host MSC 141.

It should be noted that, although registered with the host MSC 141, the user's mobile handset is not operatively connected to the host MSC 141. The user, and the handset, may be on a suitably equipped vehicle anywhere in the world within the coverage area of the satellite network 106.

The user's details, including any diversion instructions, are next sent by the Home Location Register 171 to the network's VLR 144. A store 147 records a copy of the details of these diversion instructions for subsequent retrieval when the mobile unit deregisters.

Conventionally, any incoming calls for a mobile user are sent in the first instance to the user's home network 107, and the HLR 171 provides information to identify the MSC where the mobile handset is expected to be found, which is the host MSC 141. Consequently, in the present arrangement, any incoming calls intended for the mobile user will now be directed to the network 104, as the mobile user is currently registered there.

The interface unit 148 passes the AES code to a call diversion instruction unit 146, which generates a "divert on busy" instruction to the VLR 144. This is a standard divert arrangement, and operates such that should the mobile unit appear to be already engaged on a call when a new call attempt is made to it, the new call attempt is diverted to a specified directory number, in this case the AES code allocated to the mobile unit. This diversion instruction replaces any previous instruction held in the VLR 144.

Finally, the registration process is closed by returning an authorisation code from the host MSC 141 to the subscriber management system 42 of the satellite system 4, to allow the IMSI to be recognised as a valid user identification for subsequent outgoing calls.

In this embodiment the user can use his own cellular telephone for voice calls. To allow the use of the at seat display system 210 for data messages, not suitable for transmission over the PSTN and satellite system in their original form, it is arranged that the MSC 141 has similar features to those described for the MSC 50 and described with reference to FIGS. 9 and 10. However, the invitation (step 992) is sent as a voice message to the user terminal 110, and prompts the user to identify his at-seat terminal (in practice the user will be asked for his seat number), either by key presses (using DTMF coding) or by voice (step 995). The acceptance step is therefore performed over the voice network, rather than the data network. The MSC uses this information to generate an AES code identifying the user terminal, to be applied to the data message 910 (FIG. 9). The host MSC may store this code for use with subsequent data messages, allowing the host MSC 141 to process further data messages without requesting this information from the user again.

The request for the user's seat number may instead be made when he first registers his telephone 110 with the onboard MSC 116.

What is claimed is:

1. A method of forwarding a data message to a vehicle, comprising: registering a user's cellular identity as present aboard a vehicle; receiving a data message intended for the cellular telephone associated with the user's cellular identity, the data message including at least a first address and a data packet, the first address being associated with the user's cellular identity; sending an advisory message to a destination address representing a wireless node aboard the vehicle, the advisory message indicating that the data message is available for forwarding to the node and requesting authorization from the user to forward the data message; receiving an affirmative response to the advisory message; associating the data packet with the destination address; and forwarding the data packet to the vehicle consistent with the destination address.

2. The method of claim 1, further comprising:
said registering comprising linking the user's cellular identity with the destination address; and
said associating comprising using the contents of the first address to identify the destination address.

3. The method of claim 1, wherein said receiving an affirmative response comprises receiving at least a voice authorization to forward the data message.

4. The method of claim 1, wherein said receiving an affirmative response comprises receiving at least a coded authorization to forward the data message.

5. The method of claim 1, wherein said receiving an affirmative response comprises receiving at least the destination address.

6. A method of forwarding a data message to a vehicle, comprising: registering a user's cellular identity as present aboard a vehicle; receiving a data message intended for the cellular telephone associated with the user's cellular identity, the data message including at least a first address and a data packet, the first address being associated with the user's cellular identity; associating the data packet with a destination address, the destination address representing a wireless node aboard the vehicle; and forwarding the data packet to the vehicle consistent with the destination address; wherein the data packet is originally configured for transmission over a cellular telephone network for display by a cellular telephone handset, and said reconfiguring reconfigures the data packet for transmission over a telecommunications network for display by a display mounted in the vehicle.

* * * * *